US012558276B2

(12) United States Patent
Schmidt et al.

(10) Patent No.: US 12,558,276 B2
(45) Date of Patent: Feb. 24, 2026

(54) MOBILE STANDER WITH ENHANCED ADJUSTABILITY AND STORAGE

(71) Applicant: Altimate Medical Holdings, Inc., Morton, MN (US)

(72) Inventors: Jeffrey Vernon Schmidt, Redwood Falls, MN (US); Terrence Ziemek, Broomfield, CO (US); Trevor Andrew Bartz, Prinsburg, MN (US); Matthew Haugen, Hector, MN (US); Mark Joseph Schmitt, Atwater, MN (US); David Paul Scott, Overland Park, KS (US)

(73) Assignee: ALTIMATE MEDICAL HOLDINGS, INC., Morton, MN (US)

(*) Notice: Subject to any disclaimer, the term of this patent is extended or adjusted under 35 U.S.C. 154(b) by 218 days.

(21) Appl. No.: 18/457,886

(22) Filed: Aug. 29, 2023

(65) Prior Publication Data

US 2024/0065906 A1 Feb. 29, 2024

Related U.S. Application Data

(60) Provisional application No. 63/401,956, filed on Aug. 29, 2022.

(51) Int. Cl.

| | |
|---|---|
| ***A61G 5/08*** | (2006.01) |
| ***A61G 5/10*** | (2006.01) |
| ***A61G 5/12*** | (2006.01) |

(52) U.S. Cl.

CPC .......... *A61G 5/0833* (2016.11); *A61G 5/0883* (2016.11); *A61G 5/1094* (2016.11); *A61G 5/128* (2016.11)

(58) Field of Classification Search

CPC .. A61G 5/0833; A61G 5/1094; A61G 5/0883; A61G 5/128; A61G 5/14; A61G 7/10; A61H 3/04

USPC .......................................................... 280/647

See application file for complete search history.

(56) References Cited

U.S. PATENT DOCUMENTS

| | | | |
|---|---|---|---|
| 339,650 | A | 4/1886 | Hill |
| 1,703,375 | A | 2/1929 | Volk |
| 1,924,182 | A | 8/1933 | Fritz |
| 2,812,010 | A | 11/1957 | Abdallah |
| 3,966,202 | A | 6/1976 | Cynamon |
| 4,114,873 | A | 9/1978 | Jones |
| 4,340,215 | A | 7/1982 | Murphy |
| 4,651,719 | A | 3/1987 | Funk et al. |
| 4,732,379 | A | 3/1988 | Bodine-Reese et al. |
| 4,744,578 | A | 5/1988 | Stearns |

(Continued)

FOREIGN PATENT DOCUMENTS

| | | |
|---|---|---|
| SE | 532606 C2 | 3/2010 |

OTHER PUBLICATIONS

International Searching Authority, "International Search Report and Written Opinion", From Application No. PCT/US2023/073091, Mailed Dec. 22, 2023, pp. 1-16.

*Primary Examiner* — James A Shriver, II
*Assistant Examiner* — Hilary L Johns
(74) *Attorney, Agent, or Firm* — Fredrikson & Byron, P.A.

(57) ABSTRACT

A stander device with improvements to facilitate and/or make more convenient the adjustment and/or repositioning of various elements of the stander device for sizing and comfort of a patient/user, as well as making the folding, storage, and transportation thereof more convenient.

26 Claims, 12 Drawing Sheets

(56) References Cited

U.S. PATENT DOCUMENTS

| | | | | |
|---|---|---|---|---|
| 4,934,725 | A | 6/1990 | Owens | |
| 4,976,623 | A | 12/1990 | Owsley | |
| 5,016,300 | A | 5/1991 | Jandrakovic | |
| 5,033,460 | A | 7/1991 | Goldish | |
| D326,437 | S | 5/1992 | Kuhl et al. | |
| D327,041 | S | 6/1992 | Kuhl et al. | |
| D329,833 | S | 9/1992 | Andersson et al. | |
| 5,147,265 | A | 9/1992 | Pauls et al. | |
| 5,147,286 | A | 9/1992 | Meals | |
| 5,155,789 | A | 10/1992 | Le Noane et al. | |
| 5,172,925 | A | 12/1992 | Kendrick et al. | |
| 5,176,597 | A | 1/1993 | Bryne | |
| D339,315 | S | 9/1993 | Lindkvist et al. | |
| 5,242,180 | A | 9/1993 | Bergeron | |
| D347,604 | S * | 6/1994 | Ernst | D12/132 |
| 5,399,138 | A | 3/1995 | Jones | |
| 5,403,253 | A | 4/1995 | Gaylord | |
| 5,417,472 | A | 5/1995 | Elvinsson | |
| 5,464,383 | A | 11/1995 | Padden et al. | |
| D367,024 | S | 2/1996 | Moeller | |
| 5,489,258 | A | 2/1996 | Wohnsen et al. | |
| 5,526,893 | A | 6/1996 | Higer | |
| D372,890 | S | 8/1996 | Ferm et al. | |
| 5,553,855 | A | 9/1996 | Balestrieri | |
| 5,569,172 | A | 10/1996 | Padden et al. | |
| 5,618,055 | A | 4/1997 | Mulholland | |
| 5,626,540 | A | 5/1997 | Hall | |
| 5,667,461 | A | 9/1997 | Hall | |
| 5,746,688 | A | 5/1998 | Prager | |
| 5,755,649 | A | 5/1998 | Bimby | |
| D399,272 | S | 10/1998 | Zwonitzer | |
| 5,941,807 | A | 8/1999 | Cassidy et al. | |
| 6,053,519 | A | 4/2000 | Poindexter et al. | |
| 6,099,447 | A | 8/2000 | Ramsaroop | |
| D448,706 | S | 10/2001 | Ferm | |
| D501,432 | S | 2/2005 | Mller | |
| 6,890,288 | B2 | 5/2005 | Bingham | |
| 6,941,595 | B1 | 9/2005 | Michael | |
| 7,036,512 | B2 | 5/2006 | Harnois | |
| 7,131,936 | B2 | 11/2006 | Schlosser | |
| 7,134,678 | B2 | 11/2006 | Lindkvist et al. | |
| 7,275,554 | B2 | 10/2007 | Mullholand | |
| 7,294,094 | B1 | 11/2007 | Howle | |
| 7,338,418 | B2 | 3/2008 | Erez | |
| 7,341,543 | B2 | 3/2008 | Dandy | |
| D566,409 | S | 4/2008 | Lindqvist et al. | |
| 7,354,412 | B2 | 4/2008 | Verdonk et al. | |
| 7,400,245 | B1 | 7/2008 | Johnson | |
| 7,404,567 | B2 | 7/2008 | Mller | |
| D588,051 | S | 3/2009 | Mller et al. | |
| D598,680 | S | 8/2009 | Birk | |
| D602,405 | S | 10/2009 | Skafdrup et al. | |
| 7,651,450 | B2 | 1/2010 | Wehrell | |
| D609,138 | S | 2/2010 | Skafdrup et al. | |
| 7,658,448 | B2 | 2/2010 | Birk et al. | |
| 7,780,587 | B2 | 8/2010 | Thornton et al. | |
| 7,921,485 | B2 * | 4/2011 | Biersteker | A61G 5/14 5/81.1 R |
| 7,996,935 | B1 | 8/2011 | Chen | |
| 8,007,418 | B2 | 8/2011 | Levert et al. | |
| 8,142,379 | B2 | 3/2012 | Verdonk et al. | |
| 8,186,695 | B2 | 5/2012 | Mller | |
| 8,186,756 | B2 | 5/2012 | Jrgensen | |
| D681,357 | S | 5/2013 | Sjstrand et al. | |
| D681,358 | S | 5/2013 | Sjstrand et al. | |
| D696,162 | S | 12/2013 | Skafdrup et al. | |
| D703,107 | S | 4/2014 | Moller | |
| 8,794,252 | B2 | 8/2014 | Alghazi | |
| D729,534 | S | 5/2015 | Ferm et al. | |
| D729,535 | S | 5/2015 | Ferm et al. | |
| D729,536 | S | 5/2015 | Ferm et al. | |
| D729,537 | S | 5/2015 | Ferm et al. | |
| 9,038,212 | B2 * | 5/2015 | Yamaguchi | A61G 7/1046 5/87.1 |
| D744,909 | S | 12/2015 | Birk | |
| 9,239,616 | B1 | 1/2016 | Carrell | |
| 9,259,603 | B2 | 2/2016 | Wireman | |
| 9,314,387 | B2 | 4/2016 | Alghazi | |
| 9,364,379 | B2 * | 6/2016 | Hammond | A61G 7/10 |
| 9,370,680 | B1 | 6/2016 | Macaulay et al. | |
| 9,452,102 | B2 | 9/2016 | Ledea | |
| 9,649,243 | B2 | 5/2017 | Johnson et al. | |
| 9,657,770 | B2 | 5/2017 | Mller | |
| 9,662,526 | B2 | 5/2017 | Agrawal et al. | |
| 9,827,154 | B2 | 11/2017 | Mller et al. | |
| 9,931,257 | B2 * | 4/2018 | Lokken | A61G 7/1001 |
| 10,052,252 | B2 | 8/2018 | Lin et al. | |
| 10,179,258 | B1 | 1/2019 | Sabbagh | |
| 10,220,246 | B2 | 3/2019 | Lernihan | |
| 10,232,209 | B2 | 3/2019 | Pouchet | |
| 10,232,210 | B2 | 3/2019 | Pena-Ruiz | |
| 10,265,576 | B2 | 4/2019 | Kamins | |
| 10,272,289 | B2 | 4/2019 | Kamins | |
| 10,293,206 | B2 | 5/2019 | Kamins | |
| 10,482,927 | B2 | 11/2019 | Huang et al. | |
| 10,576,009 | B2 | 3/2020 | Richter et al. | |
| 10,639,220 | B1 | 5/2020 | Smith | |
| 10,709,633 | B2 | 7/2020 | Kazerooni et al. | |
| 11,083,924 | B2 | 8/2021 | Borisoff et al. | |
| 11,166,866 | B2 | 11/2021 | Ye et al. | |
| 11,458,061 | B1 | 10/2022 | Meincke, II et al. | |
| 2002/0135219 | A1 | 9/2002 | Rogers | |
| 2003/0176229 | A1 | 9/2003 | Jacobys Schutte | |
| 2004/0106886 | A1 | 6/2004 | Verdonk et al. | |
| 2004/0267175 | A1 | 12/2004 | Harnois | |
| 2005/0034231 | A1 * | 2/2005 | Huang | A61G 7/1017 5/86.1 |
| 2007/0015641 | A1 | 1/2007 | Demeniuk | |
| 2009/0048549 | A1 | 2/2009 | Verdonk et al. | |
| 2009/0165203 | A1 * | 7/2009 | Biersteker | A61G 5/14 5/83.1 |
| 2010/0292053 | A1 | 11/2010 | Levert et al. | |
| 2011/0024374 | A1 | 2/2011 | Brown et al. | |
| 2013/0263374 | A1 * | 10/2013 | Yamaguchi | A61G 7/1046 5/87.1 |
| 2014/0261363 | A1 | 9/2014 | Lu | |
| 2014/0302971 | A1 | 10/2014 | Vining, III | |
| 2015/0035978 | A1 | 2/2015 | Johnston | |
| 2016/0008195 | A1 * | 1/2016 | Lokken | A61G 5/1091 5/610 |
| 2016/0236032 | A1 | 8/2016 | Kamins | |
| 2016/0296784 | A1 | 10/2016 | Kamins | |
| 2016/0296785 | A1 | 10/2016 | Kamins | |
| 2018/0264316 | A1 | 9/2018 | Liu | |
| 2019/0030412 | A1 | 1/2019 | Benet | |
| 2019/0176008 | A1 | 6/2019 | Antelme et al. | |

* cited by examiner

MOBILE STANDER WITH ENHANCED ADJUSTABILITY AND STORAGE

RELATED APPLICATIONS

This application claims priority to U.S. Provisional Patent Application No. 63/401,956, filed Aug. 29, 2022, the entire contents of which are incorporated herein by reference.

BACKGROUND

A stander device or apparatus (or wheeled stander or standing wheelchair) is a device that may be used to help certain people (e.g., patients) achieve regular mobility and/or to enable or facilitate standing the person up. Standers may be used, for example, by people having a mild to severe mobility impairment, such as a spinal cord injury, traumatic brain injury, cerebral palsy, spina bifida, muscular dystrophy, multiple sclerosis, stroke, rett syndrome, post-polio syndrome, and other conditions. A stander may provide a variety of standing options and positions to accommodate a range of impairments. Even where there is little, or no, control over the muscle groups that normally support a person in a standing posture, the standing posture itself can improve blood flow, increase bone density, improve flexibility and range of motion, and improve the person's sense of well-being by simply allowing that person to stand.

There continues to be a need to improve the ability to adjust stander devices to accommodate changing the position of a patient, or for the comfort of a patient, or to facilitate folding, storage, and/or transportation of the stander device.

SUMMARY

In general, this disclosure is directed to a stander device, and to improvements in stander devices, to facilitate or make more convenient the adjustment and/or repositioning of various elements of the stander device.

A stander according to some embodiments of this disclosure includes a base portion, a main support portion, and a patient support portion. The base portion may include a lateral support and a forward support coupled to a portion of the lateral support. The main support portions can include a support bracket coupled to the base portion, and an elongate support portion pivotably coupled to the support bracket. The patient support portion includes a patient support frame and at least one footrest disposed near a first end of the patient support portion. The patient support frame can be pivotably coupled to the elongate support portion. The elongate support portion has a supporting configuration where it extends upward from the support bracket and supports the patient support portion pivotably coupled thereto. The elongate support portion also has a folded configuration where it has pivoted from the support bracket and is positioned generally parallel to the forward support of the base portion.

A stander according to some embodiments of this disclosure includes a base portion, a main support portion, and a patient support portion. The base portion may include a lateral support and a forward support coupled to a portion of the lateral support. The main support portions can include a support bracket coupled to the base portion, and an elongate support portion pivotably coupled to the support bracket. The patient support portion includes a patient support frame and at least one footrest disposed near a first end of the patient support portion. The patient support frame can be pivotably coupled to the elongate support portion. The patient support portion may further include one or more adjustable body supports, each of which may comprise a patient contact surface, a first elongate attachment bar, and a releasably engageable fastener. The first elongate attachment bar may have a polygonal cross-sectional shape. Loosening the releasably engageable fastener relative to the first elongate attachment bar may facilitate rapid repositioning of the patient contact surface by enabling movement in at least two directions: (a) translation of the releasably engageable fastener and/or the patient contact surface along a length of the first elongate attachment bar, and (b) rotation of the releasably engageable fastener and/or the patient contact surface about an axis of the first elongate attachment bar. In some embodiments, a second elongate attachment bar can be pivotably coupled to the first elongate attachment bar at a pivot joint therebetween, yielding additional flexibility in positioning of the patient contact surface. In some embodiments, the pivot joint may include a release button that enables pivotable movement of the first and second elongate attachment bars relative to each other when the release button is pressed or actuated. The pivot joint may be configured to have a finite, predetermined number of detent positions corresponding to a finite number of angular displacements between the first and second elongate attachment bars.

The details of one or more examples are set forth in the accompanying drawings and the description below. Other features, objects, and advantages will be apparent from the description and drawings.

DETAILED DESCRIPTION

Figure 1:
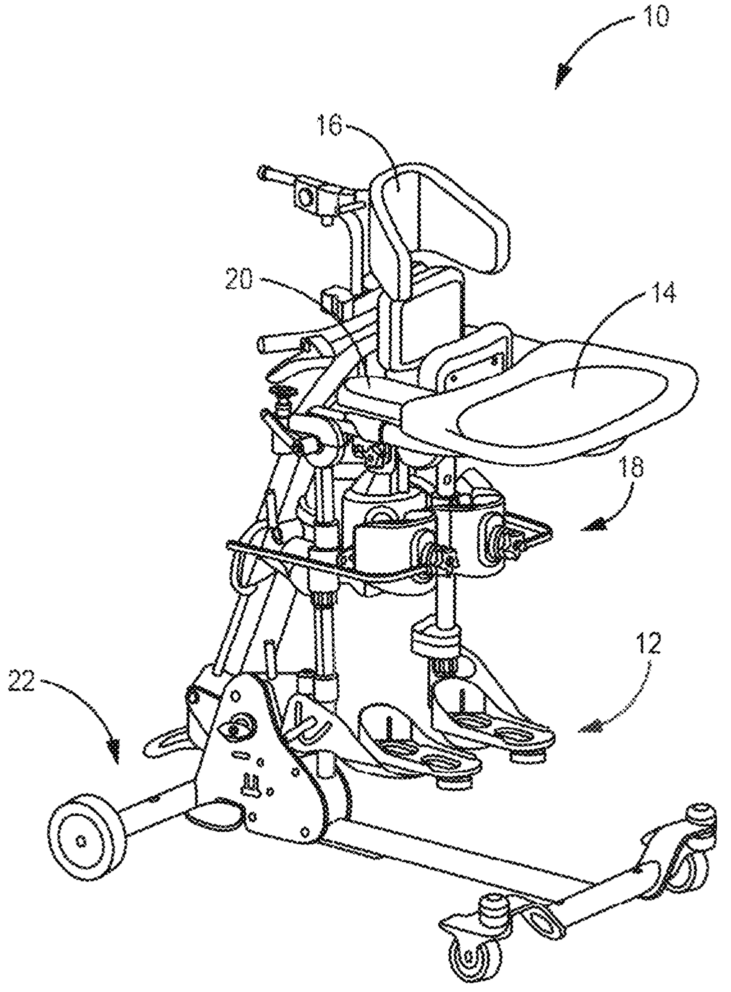
FIG. 1 is a perspective view of a stander according to various embodiments of this disclosure.

FIG. 1 is a perspective view of a stander device 10 according to various embodiments of this disclosure. Elements of the stander device 10 may include foot rests 12, tray 14, head rest 16, knee supports 18, arm rests 20, and wheeled base 22.

Figure 2A:
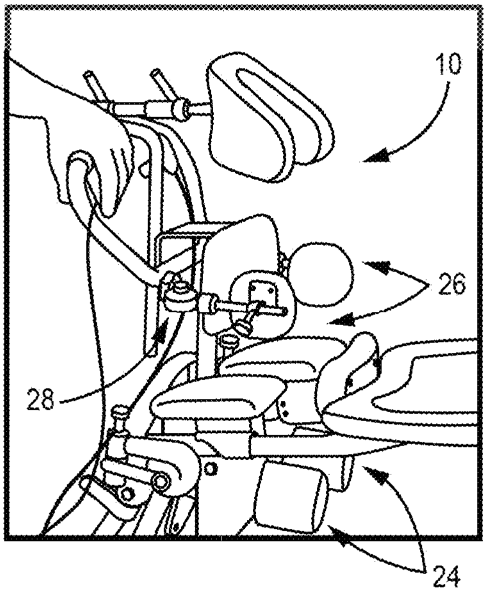
FIGS. 2A-2B are images showing an adjustment mechanism for a stander device to facilitate adjustment of a lateral support of a stander according to various embodiments of this disclosure.
Figure 2B:
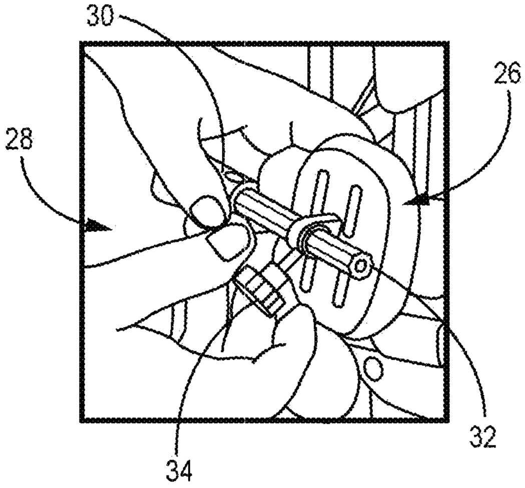

FIGS. 2A-2B are images showing an adjustment mechanism, which may be used to quickly and conveniently enable a lateral support (sometimes referred to as a "lat" support in reference to a user's latissimus dorsi or "lats") of a stander device 10 to be repositioned or adjusted, or moved out of the way, in some embodiments. For example, FIG. 2A is an image of a portion of a stander device 10, showing an adjustment mechanism 28, which may be used to quickly and conveniently adjust a lateral support (left and right pads). FIG. 2B is an enlarged image of an exemplary adjustment mechanism 28 associated with a lateral support pad 26 (right pad shown), for example. As shown in this example, adjustment mechanism 28 may comprise a shaped attachment bar 32, configured to be coupled to a pad or support (e.g., right lateral support pad 26 in FIG. 2B) via an attachment knob 34. The shaped attachment bar 32 may have an octagonal cross-sectional shape, as shown in the example of FIG. 2B. This may, for example, facilitate adjusting the angle of lateral support pad 26 to a number of discrete angular positions relative to the patient (e.g., upon sufficient loosening/tightening of attachment knob 34). In some embodiments, the attachment knob 34 could be loosened (e.g., unscrewed) to enable adjustment of the angle of the pad, while the axial position of the pad remains locked in place. Of course, other cross-sectional shapes could be employed for shaped attachment bar 32, such as hexagonal, pentagonal, square, triangular, etc., with the ability to provide a similar effect. Further, the attachment knob 34 may similarly enable forward and backward adjustment in the position of lateral support pad 26 relative to the patient.

Adjustment mechanism 28 may further comprise a button 30 at a pivot point of the adjustment mechanism 28. In FIG. 2B, button 30 (partially obscured by the left hand of an operator) is coupled to an end of shaped attachment bar 32. In some embodiments, a second attachment bar 33 (not shown in FIG. 2B), which may be similar to shaped attachment bar 32 in some embodiments, may be coupled to and extend from button 30 as part of adjustment mechanism 28 (obscured from view in FIG. 2B). Button 30 may include a push-button release mechanism that facilitates pivotable relative positioning of the two attachment bars in such embodiments (e.g., varying angles between the two shaped attachment bars 32). In some embodiments, button 30, when pushed/depressed, enables ratcheting pivotable movement between the two attachment bars. This may, for example, enable rapidly swinging the lateral support pads 26 out of the way when needed, or to finely adjust the positioning of such pads according to patient comfort or other needs.

Figure 2C:
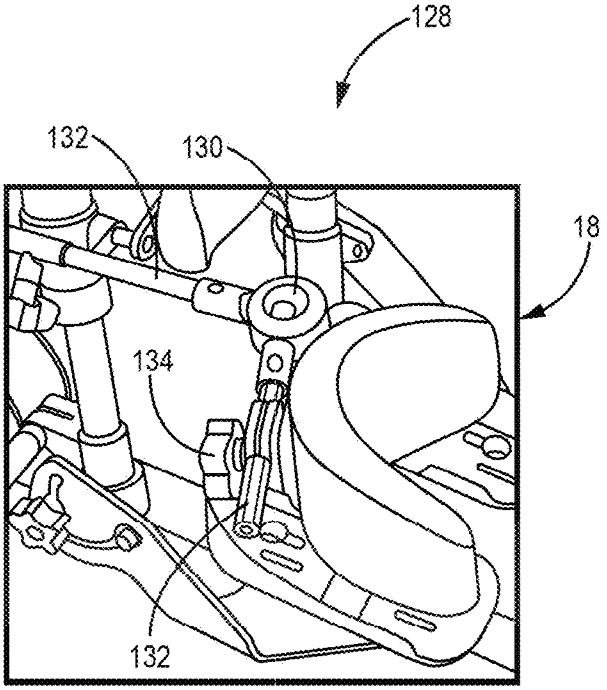
FIG. 2C is an image showing an adjustment mechanism to facilitate adjustment of a knee support of a stander according to various embodiments of this disclosure.

FIG. 2C is an image of an adjustment mechanism 128 somewhat similar to the one depicted in FIG. 2B, employed in this example with respect to a knee support 18 (right knee support shown in FIG. 2C) of stander device 10. The adjustment mechanism 128 in FIG. 2C shows two shaped attachment bars 132 (e.g., octangular cross-sections in the examples depicted) extending from the button 130. As shown, knee support 18 has been swung outward almost 180 degrees from its use position in order to quickly clear or free a patient from stander device 10, as the need may arise. As similarly noted above with respect to FIG. 2B, button 130 in FIG. 2C may facilitate locking and holding a given angular position between the two shaped attachment bars 132 when not pressed, and may enable pivotable ratcheting to a desired angular position upon pushing/depressing button 130, according to various embodiments. Attachment knob 134 is also shown in FIG. 2C and may similarly facilitate adjusting the angle of knee supports 18 to a number of discrete angular positions relative to the patient (e.g., upon sufficient loosening/tightening of attachment knob 134 and rotation of knee support 18 about an axis (e.g., a longitudinal axis) of attachment bar 132). Additionally, attachment knob 134 may be used to enable repositioning of knee support 18 inward or outward (e.g., axially along a length of a shaped attachment bar 132, for example).

Other adjustable body supports (e.g., similar to the lateral support pad 26 and knee supports 18 described above) may be coupled to the patient support frame 92 with similar adjustment capabilities. For example, an adjustable body support may comprise a patient contact surface (e.g., a pad to be placed in contact with a patient to support a portion of the patient) and a first elongate attachment bar coupled to the patient contact surface. The first elongate attachment bar may have a polygonal cross-sectional shape in some embodiments. The adjustable body support may also comprise a releasably engageable fastener, such as a threaded compression fit fastener. The adjustable body support may be repositioned, for example, by releasing (or loosening) the releasably engageable fastener and (a) translating either or both of the patient contact surface and the releasably engageable fastener along an axis of the first elongate attachment bar, and/or (b) rotating one or more of the patient contact surface and the releasably engageable fastener about an axis of the first elongate attachment bar. This repositioning capability can facilitate adjusting both the lateral position (e.g., right/left position) of the adjustable body support and the angular position (e.g., downward/upward angle) of the adjustable body support. As noted above with reference to corresponding portions of the lateral support pad 26 and knee supports 18, the first elongate attachment bar may have a polygonal cross-section shape that could be any of the following shapes: triangular, rectangular/square, pentagonal, hexagonal, heptagonal, octagonal, etc.

In some embodiments, the adjustable stander 10 may have one or more adjustable body supports that further include a second elongate attachment bar that is pivotably coupled to the first elongate attachment bar at a pivot joint. The pivot joint may include a release button that enables a user to adjust the angle formed between the first elongate attachment bar and the second elongate attachment bar. For example, the pivot joint may be configured to releasably adjust the angle between the first and second elongate attachment bars upon actuation of the release button. In certain embodiments, pressing (and subsequently releasing) the button of the pivot joint may enable a user to adjust and select the relative angle between the attachment bars from a plurality of detent positions. In some embodiments, the pivot joint may be configured to quickly release and fully open the angle between the elongate attachment bars. For example, the release button of the pivot joint may enable a user to releasably adjust the angle formed between the first and second elongate attachment bars to a fully open position (e.g., opened outwardly or laterally as much as possible) upon actuation of the release button to facilitate rapid egress of a person/patient from the adjustable stander, if needed.

The adjustable body supports described herein (such as the lateral support pad 26 and knee supports 18) may be employed prior to and/or in conjunction with folding the stander 10 into a folded configuration for storage. For example, the quick release buttons of the pivot joints may enable a user to move a number of associated adjustable body supports out of the way or into a position that allows folding of the stander into a compact profile for storage.

Figure 2D:
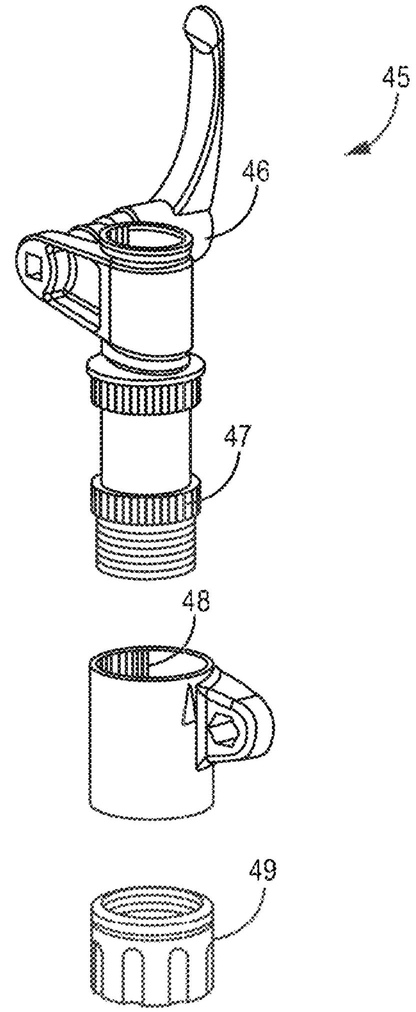
FIG. 2D is an exploded perspective view of an adjustment mechanism to facilitate adjustment of foot and/or knee supports of a stander according to various embodiments of this disclosure.

FIG. 2D is an exploded perspective view of an adjustment mechanism 45 that may be employed to facilitate adjustment of one or more foot supports and/or knee supports of a stander 10 according to various embodiments of this disclosure. For example, clamp(s) 46 as shown in FIG. 2D may be used to facilitate adjustment of the associated foot support and/or knee support upward or downward, e.g., by actuation of the control lever of clamp 46. Similarly, the clamp(s) 46 can also be adjusted rotationally by unscrewing the associated threaded end cap 49. The clamp 46 may then be lowered (e.g., pushed downward) so that teeth 47 become disengaged from teeth 48. The associated foot support or knee support may then be rotated (e.g., about a relatively vertical axis in the example shown in FIG. 2D) to the new desired position. The teeth 47, 48 may then be re-engaged and the threaded end cap 49 re-tightened to hold the new desired position of the associated foot support or knee support.

Figure 2E:
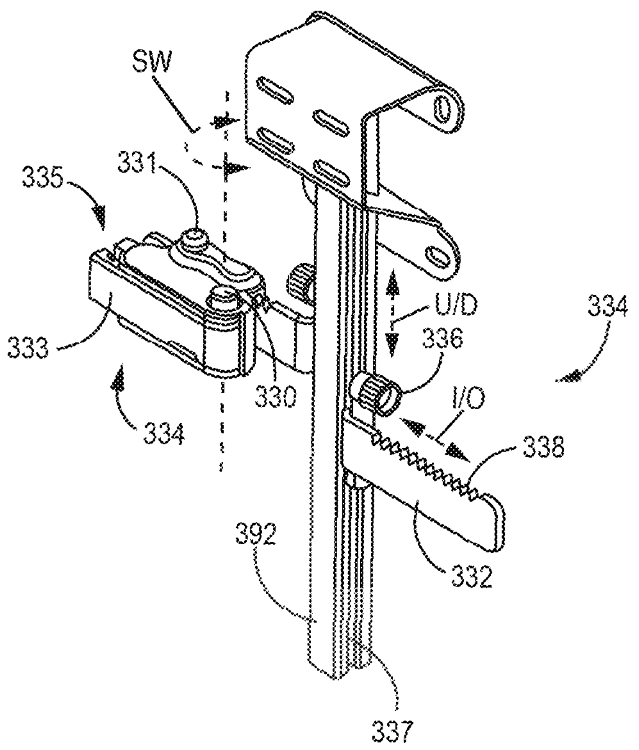
FIG. 2E is a top rear perspective view of an adjustment/support mechanism to facilitate adjustment of a lateral support of a stander according to various embodiments of this disclosure.

FIG. 2E shows an alternative embodiment of an adjustment/support mechanism, which may be used to quickly and conveniently enable a lateral support (patient contact surface) of a stander device 10 to be repositioned or adjusted or moved out of the way. For example, FIG. 2E is an upper rear perspective view showing a left adjustable body support or adjustment/support mechanism 334 (and a portion of a right adjustment/support mechanism 334) operably coupled to a portion of a patient support frame 392. As shown, the left and right adjustment/support mechanisms 334 each include a support arm 332 extending laterally (e.g., outwardly) from patient support frame 392 on either side. In some embodiments, the support arms 332 are slidably received in channels 337 that extend upward and downward along a length of patient support frame 392 to provide a vertical adjustment via releasable fastener 336 in the directions indicated by the "U/D" arrow (e.g., a change in the vertical position of the support arm 332 relative to the patient support frame 392). In some embodiments, the support arms 332 may include a surface feature 338, such as a series of notches or "teeth" 338 formed in a surface of arms 332 to facilitate adjustment of the position of the left and right adjustment/support mechanisms 334 either inward or outward as indicated by direction arrow "I/O."

Some further details of the exemplary adjustment/support mechanism 334 are described with reference to the left adjustment/support mechanism 334 in FIG. 2E with it being understood that the same could apply to a right adjustment/support mechanism 334. For example, an adjustment/support mechanism 334 may include a housing 333 coupled to a support arm 332 and configured to slidably receive or engage a support arm 332. Housing 333 may be further configured to include or support one or more actuation buttons and/or other coupling mechanisms. In some embodiments, a ratchet release button 331 disposed on housing 333 may be actuated or pressed to enable adjustable motion (e.g., repositioning) of the adjustment/support mechanism 334 inwardly or outwardly by momentarily disengaging from teeth 338, for example during the duration of the button press. In some embodiments, a pivot release button 330 disposed in or on housing 333 may be actuated or pressed to enable pivotable movement of the adjustment/support mechanism 334 (and any lateral support pads or patient contact surface, or associated support arms or links, etc.) relative to the support arm 332 about a generally vertical axis to quickly move a patient contact surface or lateral support pad out and away from a patient to facilitate rapid egress of the patient from stander 10, for example. In some embodiments, housing 333 may include a recessed notch 335 in a portion of housing 333 for coupling with a link or link arm (to be described below), for example, to thereby support a lateral pad or patient contact surface coupled thereto.

Figure 2F:
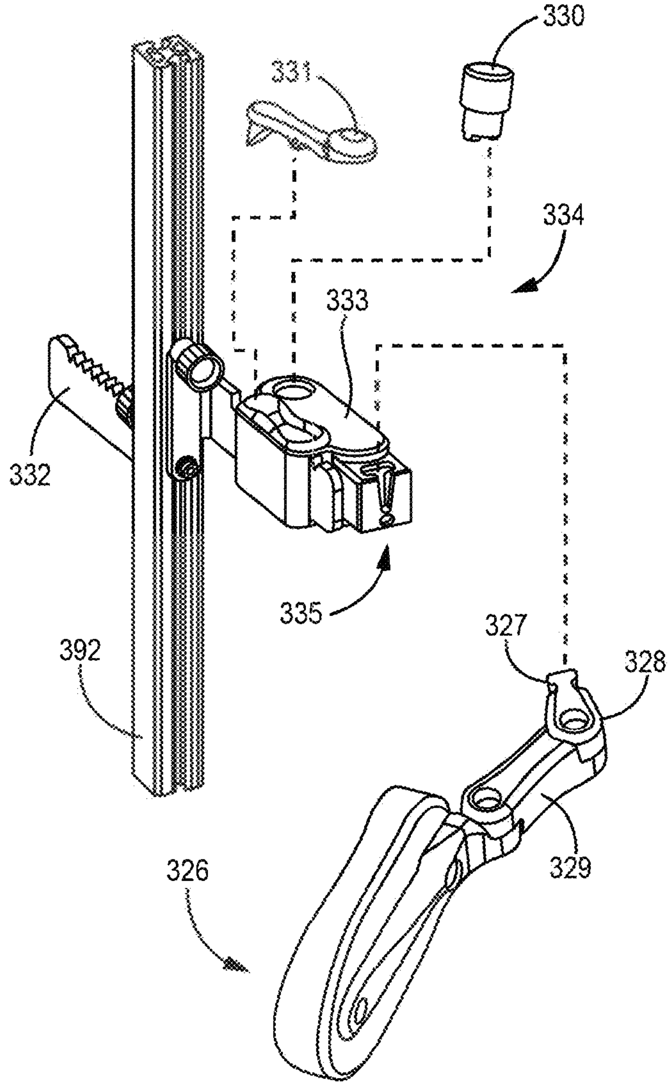
FIG. 2F is a partially exploded top front perspective view of the adjustment/support mechanism of FIG. 2E.

FIG. 2F is a partial exploded perspective view of the adjustment/support mechanism 334 of FIG. 2E showing additional details. For example, FIG. 2F shows an exemplary recessed notch 335 that tapers to receive a corresponding shaped tab 327 of a coupling link 328. One or more extension links 329 may be employed to link the adjustment/support mechanism 334 to a lateral support pad or patient contact surface 326 disposed at a distal end of the links 328, 329, according to some embodiments. Additionally, or optionally, the links 328, 329 may be configured to enable angular adjustment to be made therebetween; this may be facilitated further, for example, via the use of corresponding shaped ends and recesses that may be coupled together with releasable fasteners. Such an arrangement may enable adjusting the positioning of lateral supports or patient contact surfaces 326 on a particular stander device 10 for a custom fit that is comfortable for a particular patient, while enabling the rapid pivotable release of the adjustment/support mechanism 334 via release button 330, for example.

It should be noted that the aforementioned custom fit formed by varying the angular relationship between a series of links 328, 329 (e.g., as generally depicted in FIG. 2F) can be subsequently changed (e.g., as a given patient's comfort needs change, or to adjust for the needs of a different patient in some circumstances). For example, the angular positioning of lateral link or extension link 329 relative to coupling link 328 can be varied and secured in place via a fastener (e.g., screw, bolt/nut, etc., not shown in FIG. 2F) engaged through corresponding openings of links 329 and 328 aligned generally as shown. In some embodiments, the angular adjustment of links 329 and 328 may be enhanced by the use of corresponding mating surfaces (e.g., shaped, radial ridges or grooves) in the corresponding openings of links 329 and 328, respectively, that can align and thereby provide a more secure or stable engagement of the links according to a patient-specific adjustment of relative angles between the links. As noted above, additional lateral links 329 may be added in series as needed to accommodate patients of varying sizes.

Figure 3A:
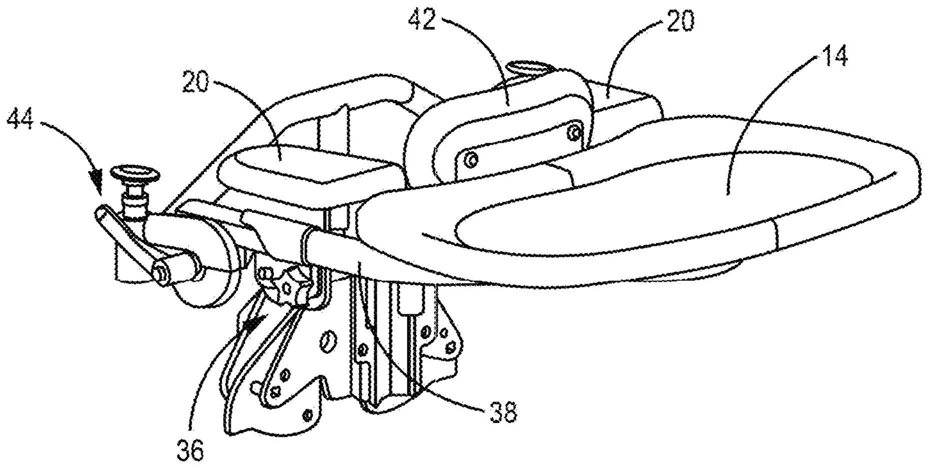
FIGS. 3A-3B are perspective views of a tray/table and arm rests of a stander device showing how the arm rests may be positioned for use and/or adjusted according to various embodiments of this disclosure.
Figure 3B:
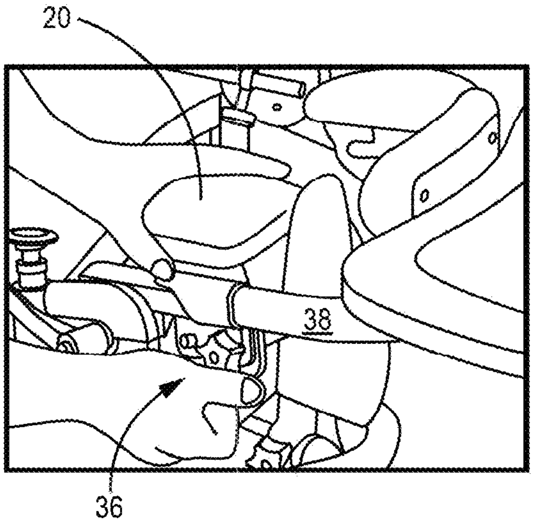

FIG. 3A is a perspective view of a portion of a stander device 10 showing a tray 14 and arm rests 20, as they may be positioned for use with a patient/user of stander device 10. Also shown in FIG. 3A is an arm rest adjuster 36 configured to reposition and/or adjust an arm rest 20 relative to a tray support rail 38, as desired. As shown, a twist knob (or release mechanism, etc.) may be part of arm rest adjuster 36 and may be configured to enable moving arm rest 20 along the X, Y, and Z axes. For example, actuation of a twist knob (or release mechanism, etc.) of arm rest adjuster 36 may enable sliding the arm rest 20 forward and/or backward along tray support rail 38, or upward and/or downward relative to tray support rail 38, and left and/or right (e.g., inward and/or outward) relative to tray support rail 38, according to various embodiments of this disclosure. FIG. 3B is an image of a portion of a stander device 10 showing an arm rest 20 being adjusted by an operator using an arm rest adjuster 36. In some embodiments, an arm rest adjuster 36 may be configured to move arm rest 20 in the X, Y, and/or Z directions while maintaining the position of the connector portion of the arm rest adjuster 36 along the tray support rail 38.

With further reference to FIG. 3A, a chest pad 42 is shown positioned adjacent the inside edge of tray 14 (e.g., between a patient's chest and tray 14). Also shown in FIG. 3A is a tray angle adjustment 44. Tray 14 may be configured to be tilted upward or downward for various reasons by actuation of tray angle adjustment 44 by a user or by the patient. For example, tray angle adjustment 44 may be actuated (e.g., by rotating a lever arm, or pressing a release button, for example), and tray 14 may be positioned at an angle tilting either upwards or downwards. The chest pad 42 in FIG. 3A may have the ability to adjust its angle relative to the tray. Chest pad 42 may have a hinge joint, for example, that allows for tilting of the chest pad 42 relative to the tray 14 to thereby enable the chest pad 42 to remain flush against the patient's chest during tilting of the tray 14 upwards or downwards. For example, chest pad 42 may be configured to tilt upward/backward or downward/forward relative to the tray 14, and/or may be able to freely tilt/pivot to conform to a patient's chest upon adjustment of the angle of tray 14; if the chest pad 42 were rigidly attached or coupled to tray 14, it would not be able to maintain a flush position seated against the patient's chest during such angling of the tray 14. However, by enabling relative tilting of the angle between tray 14 and chest pad 42, the chest pad 42 may be maintained in a more secure and/or comfortable position against the patient's chest while adjusting the tray angle via tray angle adjustment 44.

Figure 4A:
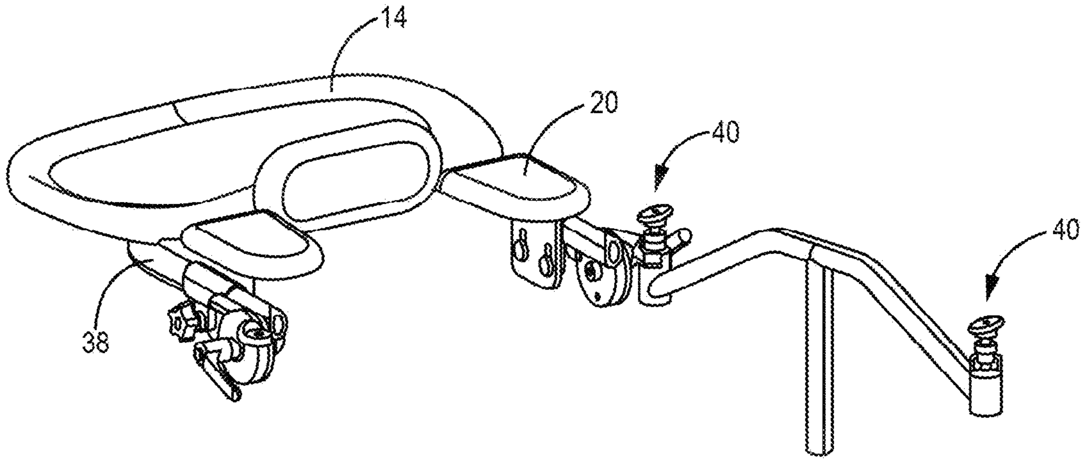
FIGS. 4A-4B are perspective views of a portion of a stander device showing a tray/table being moved/positioned according to various embodiments of this disclosure.
Figure 4B:
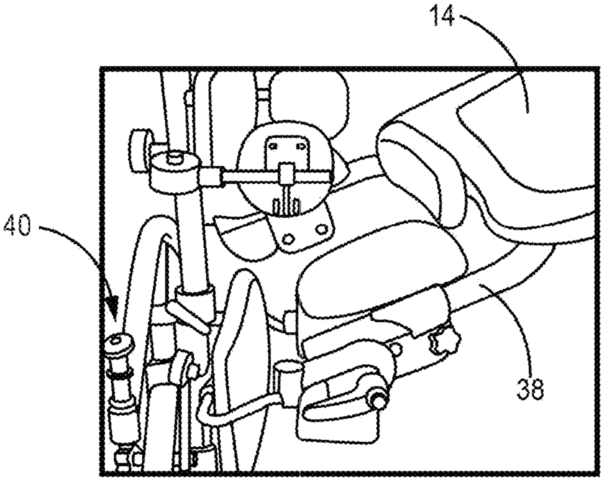

FIG. 4A is a perspective view of a portion of a stander device 10 showing a tray 14 and arm rests 20, as they may be optionally positioned by an operator or user of stander device 10. As shown in FIG. 4A, tray 14 and arm rests 20 have been swung outwardly (e.g., pivoted or rotated to the right, from the perspective of a patient) via the use of one or both (e.g., left and right) tray catch/latch actuators 40. In some embodiments, a tray catch/latch actuator 40 may function to secure and/or release an end of tray support rail 38 (or a coupling device engaged to an end of tray support rail 38). For example, from a secured position, tray catch/latch actuator 40 may release an end of tray support rail 38 (or a coupling device engaged to an end of tray support rail 38) via two operations or actuations: (a) the actuator 40 may be rotated a certain amount (e.g., 45 to 90 degrees, as typical examples), then (b) the actuator 40 may be pulled upward (e.g., against spring tension, for example) to enable the release. (The release may, in some embodiments, further require pulling the tray support rail 38 in a direction away from the actuator 40 in order to overcome a certain amount of friction.) Once released, the tray 14, arm rests 20, and tray support rail 38 may be able to pivot or rotate out and away from the patient as desired. As shown in FIG. 4A, the left tray catch/latch actuator 40 has released the corresponding end of tray support rail 38, while the right tray catch/latch actuator 40 allows pivotable movement thereabout to facilitate the motion of tray 14 depicted. FIG. 4B is an image of a portion of stander device 10, showing a right tray catch/latch actuator 40 that has been actuated to release the end of the tray support rail 38 on the right side. The use of tray catch/latch actuator 40 may enable a user and/or patient to quickly release the tray 14 to move it out of the way, or to remove it from the stander device 10 altogether (e.g., by releasing with both the left and right tray catch/latch actuators 40).

Figure 5:
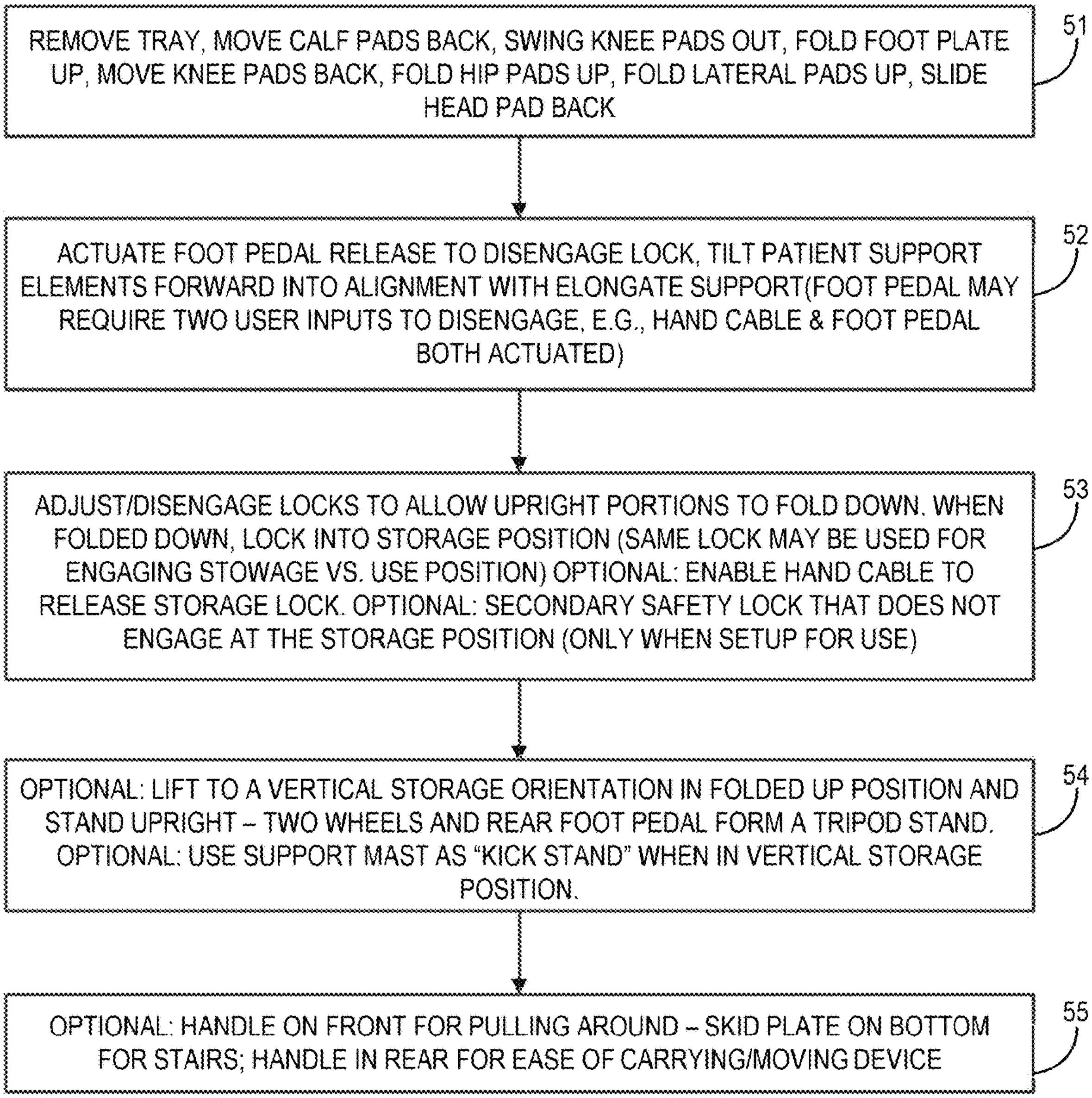
FIG. 5 is a flow diagram showing a series of steps followed to fold a stander device into a convenient storage configuration.

FIG. 5 is a flow chart showing a method of folding a stander device 10 according to various embodiments of this disclosure. Standing device 10 may, for example, fold into a storage position or folded configuration by performing the steps outlined in FIG. 5.

Step 51: As an initial step, step 51 involves moving a number of portions of stander 10 into a position to facilitate folding of stander 10. A number of adjustable body supports (e.g., calf pads, knee pads, foot plates, hip pads, lateral pads, head pad, etc.), for example are moved outward, or inward, or up/down, in order to facilitate folding of the elongate support portion, the patient support portion, and a base portion of stander 10 into a compact, substantially parallel folded configuration. Tray 14 may be removed from stander 10 using left and right tray catch/latch actuators 40. The calf pads may be moved back (e.g., toward the patient support portion of device 10); the knee pads may be swung outwardly to enable folding the foot plates upward, then the knee pads may be moved back; the hip pads may be folded upward; the lateral support pads may be folded up; and the head pad is moved backwards. In other words, the various patient support elements are moved into alignment as much as possible to facilitate folding of the stander 10 into a folded configuration.

Step 52: Foot pedal 60 (see FIG. 6A) is actuated (e.g., pressed downward in the configuration depicted in FIG. 6A) to enable tilting the patient support elements forward (and generally parallel to the rear support frame or elongate support portion of device 10. Foot pedal 60 may, in some embodiments, require two separate user inputs in order to disengage and allow pivotable movement of the patient support portion (e.g., a concurrent hand cable & foot pedal actuation), to avoid or prevent inadvertent activation, for example.

Step 53: One or more locks (e.g., release knob 66 in FIGS. 6A and 6C, described below) are adjusted/activated/disengaged to enable folding the upright portions down (e.g., pivoting the patient support portion and the elongate support portion downward into generally parallel alignment with the base portion of stander 10). The device 10 may then be locked into the storage position (or folded configuration). In some embodiments, the same locks can be used to lock the stander device 10 into either the storage position and the patient use positions. Optionally, it may be desirable to actuate a hand cable to release the storage lock. Also, a secondary safety lock may be employed that does not engage when device 10 is in the storage position, but must be engaged, for example, when setup in the USE position.

Step 54 (optional): Once folded and locked into a folded configuration, stander 10 may be lifted or oriented to a vertical storage orientation. When locked in a fully folded configuration, stander device 10 can stand upright—two wheels of the base portion and the rear foot pedal 60 (see FIG. 6A) may form a tripod that can function to hold device 10 upright vertically. In some embodiments, an optional support mast may act as a "kick stand" to further support device 10 when placed in the upright/vertical storage orientation.

Step 55 (optional): In some embodiments, a handle (not shown) may be added onto a front portion of stander device 10 to facilitate pulling and moving stander 10 around as needed (e.g., to move into storage and/or to bring to a patient location for patient use). Optionally, a skid plate may be added to a bottom portion of device 10 to aid in the navigation of stairs, for example. Additionally or optionally, a handle may also be added to a rear portion of the stander device 10 to facilitate pulling and moving device 10 around as needed.

Figure 6A:
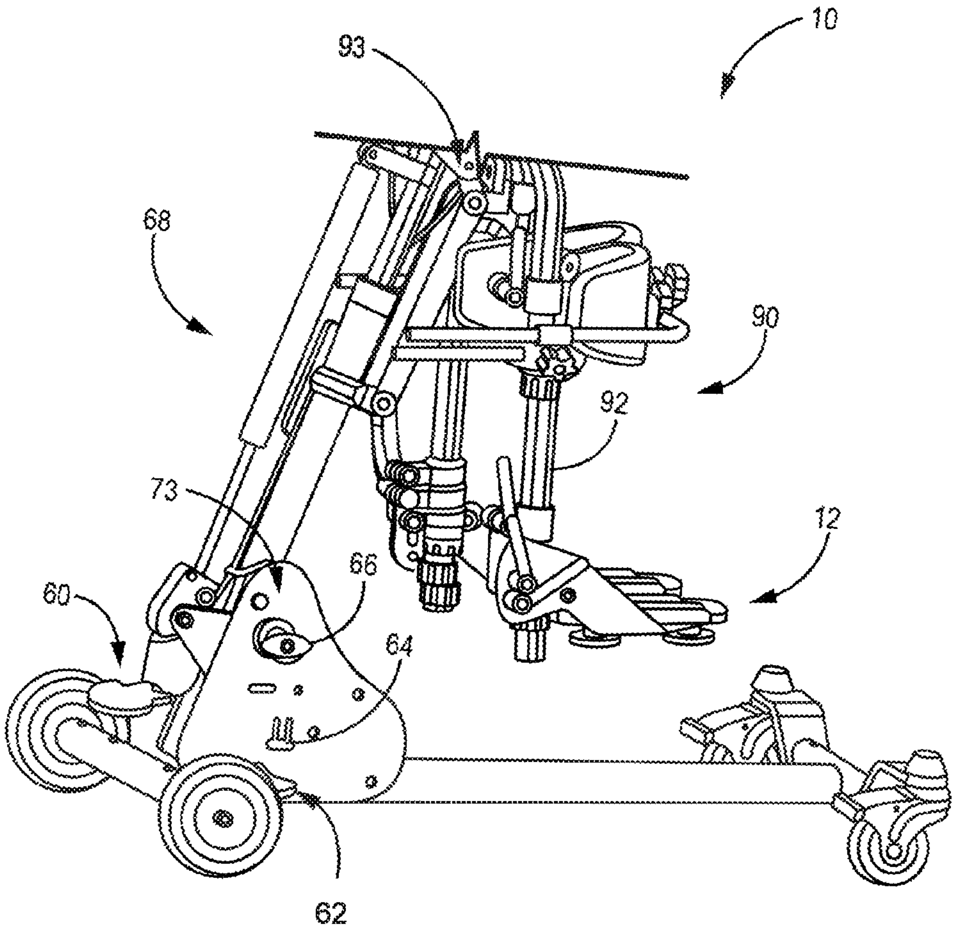
FIG. 6A is a partial perspective view of a stander device in a supporting configuration with features to enable the folding and storage of the stander device according to some embodiments of this disclosure.

FIG. 6A is a perspective view of a stander device 10 showing elements and features that may facilitate the folding and/or storage of the stander device 10. Foot pedal 60, when pressed down, enables the patient support portions to tilt forward, substantially parallel to the piston and main support structure 68 of stander device 10 (left portion in FIG. 6A). Once the patient support portions are tilted forward, one or more locking mechanisms may be employed or actuated to enable folding and/or flattening of stander device 10 toward the floor. As examples, folding knob 66 may be rotated and pulled outward (e.g., against spring tension) to enable folding forward of the device 10. In some embodiments, a separate lock 64 may be required to also be activated/deactivated in order to enable folding of device 10. In some embodiments, lock 64 may be activated by a hand control device disposed in an upper portion of device 10 (e.g., to prevent inadvertent activation, for example). An additional foot-activated lock 62 (partially shown) may be required to be pressed in order to enable pushing the device into its fully-folded position and locking it in place for storage. Once the stander device 10 has been fully folded in this manner, it may be positioned vertically to conserve storage space, as described below.

Figure 6B:
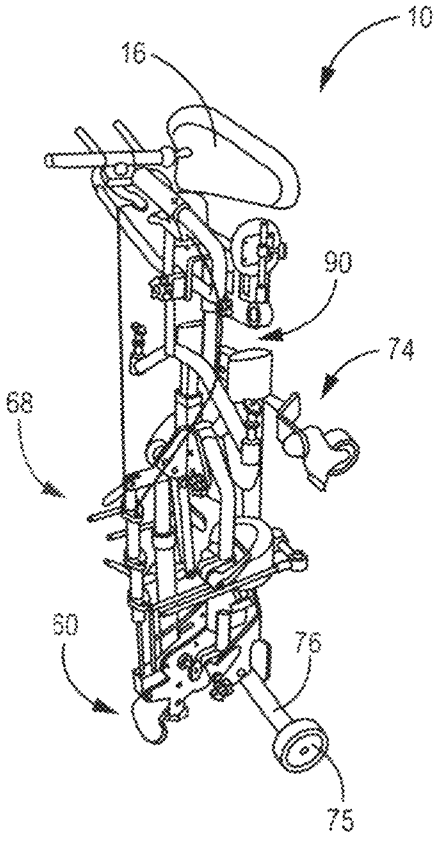
FIG. 6B is a perspective view of a stander device in a folded configuration and positioned upright for storage according to various embodiments of this disclosure.

FIG. 6B is an image of a stander device 10 that has been folded into a storage configuration and then positioned into a standing/vertical/upright orientation to facilitate storage thereof. As shown, foot pedal 60 and rear wheels 75 (only one wheel 75 shown in FIG. 6B) of the base portion 74 can form a "tripod" to enable the stander device to stand on its own in a vertical storage configuration.

Figure 6C:
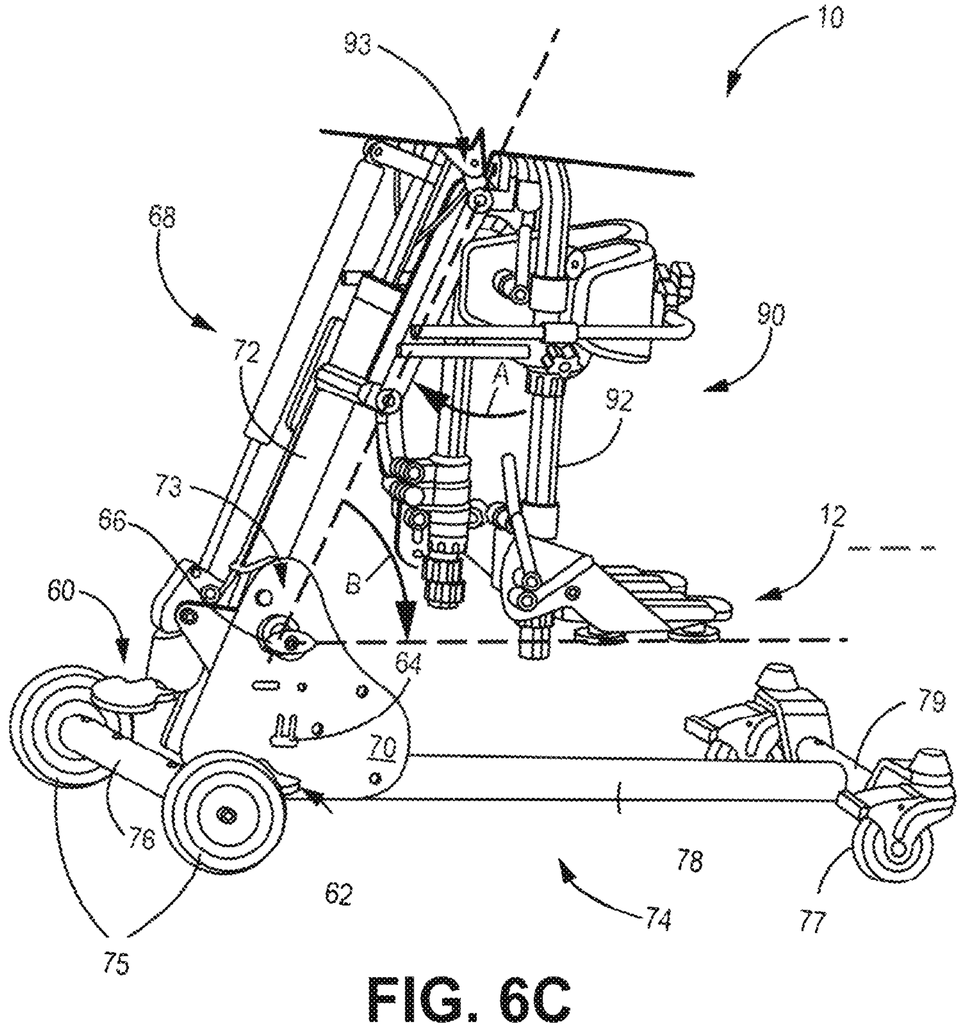
FIG. 6C is a partial perspective view of a stander device in a supporting configuration showing details of various features to enable the folding and storage of the stander device according to some embodiments of this disclosure.

FIG. 6C provides additional details of the stander 10 depicted in FIGS. 6A and 6B, showing a number of features or elements of stander 10 that may be used to actuate and/or enable folding of the stander 10 from a supporting configuration (e.g., for supporting a patient) into a folded configuration. In some embodiments, placing stander 10 in a folded configuration may be suitable for putting stander 10 into storage when not in use with a patient. In some cases, this may further include positioning the folded stander 10 into an upright position that may facilitate better usage of available storage space when stander 10 is not being used for patient support.

With reference to FIG. 6C, an embodiment of stander 10 is shown having a base portion 74, a main support portion 68 coupled to the base portion 74, and a patient support portion 90 coupled to the main support portion 68. The base portion 74 of the embodiment shown in FIG. 6C is comprised of a lateral support 76 and a forward support 78. The forward support 78 is coupled to the lateral support 76 to form the base portion 74. In some embodiments, a first end of the forward support 78 is coupled to a central portion of the lateral support 76 to form a generally T-shaped base portion 74, as in the embodiment shown. In some embodiments, the base portion 74 may further include one or more wheels to facilitate moving stander 10 from one location to another. Wheels 75 are shown rotatably coupled to lateral support 76 (e.g., wheels 75 disposed at both ends of lateral support 76) according to one embodiment. Some embodiments may alternatively, or additionally, have one or more wheels disposed at a second end of forward support 78. In the example shown, a cross-member 79 is disposed at a second end of forward support 78 (e.g., opposite the first end), and wheels 77 are rotatably coupled to either end of cross-member 79. In some cases, the cross-member 79 can be arranged to be generally perpendicular to the forward support 78 with a wheel 77 disposed at each end of cross-member 79.

The stander 10 of FIG. 6C comprises a main support portion 68, including a support bracket 70 coupled to the base portion 74, and an elongate support portion 72 pivotably coupled to the support bracket 70. In the embodiment shown, the pivotable coupling may enable pivoting of the elongate support portion 72 relative to support bracket 70 about a second pivot (or pivot point) 73 as depicted. For example, second pivot 73 may comprise one or more openings disposed near an upper portion of support bracket 70 according to various embodiments. As such, the elongate support portion 72 is pivotably coupled to the support bracket 70 and is thereby configured to pivot between a supporting configuration and a folded configuration. When the elongate support portion 72 is in the supporting configuration, it is generally upright and/or angled forward somewhat (as shown), and when the elongate support portion 72 is in the folded configuration, it is disposed generally parallel to the base portion 74. In some cases, the elongate support portion 72 is configured to be parallel and/or substantially aligned with the forward support 78 of the base portion 74 when positioned in the folded configuration. In the embodiment shown, the support bracket 70 is coupled to the forward support 78 of the base portion 74 (e.g., near a first end of the forward support 78 as shown). However, support bracket 70 could alternatively be coupled to the lateral support 76, for example, near a central portion of lateral support 76 in some alternate embodiments. Support bracket 70 may also be formed of two generally planar portions such that the elongate support portion 72 is disposed between the two planar portions to provide a mechanically stronger support for elongate support portion 72 rotatably disposed therebetween.

As shown, stander 10 of the embodiment shown in FIG. 6C comprises a patient support portion 90 configured to support a body of a person (e.g., a patient). Patient support portion 90 can include a patient support frame 92 and at least one footrest 12 disposed at a first end (e.g., a distal end) of patient support frame 92. Patient support frame 92 may comprise a generally elongate frame, which may be formed of tubes or beams or members shaped to facilitate support various parts of a patient's anatomy (e.g., footrests 12, calf/knee supports, back supports, lateral supports, arm supports, headrest 16, etc.). Patient support frame 92 may also bifurcate at certain portions (e.g., to support right and left legs, right and left arms, etc.). Patient support frame 92 can be pivotably coupled to the elongate support portion 72 at a first pivot (or pivot point) 93 as depicted generally in FIG. 6C. First pivot 93 may, for example, be disposed at a more proximal portion of patient support frame 92, such as a central portion thereof, or nearer a second end (e.g., a proximal end) of the patient support frame 92 in some embodiments. Patient support frame 92 is configured to pivot about first pivot 93 such that patient support frame 92 is positioned generally parallel to the elongate support portion 72. Further, patient support frame 92 is configured to be positioned generally parallel to the forward support 78 when the elongate support portion 72 is moved into the folded configuration.

FIG. 6C depicts the sequence of folding events with reference to the folding motion arrows labeled "A" and "B" in FIG. 6C. For example, patient support frame 92 is typically pivoted about first pivot 93 to align patient support frame 92 with elongate support portion 72 as shown by arrow A. A second or subsequent pivoting action typically next occurs by pivoting elongate support portion 72 about second pivot 73 in the manner and direction shown by arrow B in FIG. 6C. This results in the elongate support portion 72 and the patient support frame 92 being positioned generally parallel to the forward support 78 when the elongate support portion 72 is in the folded configuration. Once the stander 10 has been positioned so that the elongate support portion 72, the patient support frame 92, and the forward support 78 are all generally parallel to each other (typically by placing them all in a horizontal configuration), the stander 10 can then be lifted to a generally upright or vertical configuration for storage. In some embodiments, a feature, such as foot pedal 60 may facilitate supporting the stander 10 in the upright configuration for storage by serving as the third leg of a tripod, where a first wheel 75 and a second wheel 75 serve as the other two legs of the tripod to support the stander 10 in an upright storage configuration when the elongate support portion 72 is in the folded configuration.

With continued reference to FIG. 6C, certain other features of stander 10 may be used to control and/or enable the folding of stander 10 described herein. For example, foot pedal 60 (also referred to herein as first folding release 60, since it need not be configured as a foot operated pedal, but could also be a lever, switch, knob, etc. that could be operated by a hand or a foot, etc.) may be configured to enable pivotable movement of the patient support frame 92 relative to the elongate support portion 72 upon actuation of the foot pedal (first folding release) 60. In some embodiments, it may be desirable to require a separate actuation (and/or a concurrent actuation) in order to actuate the first folding release 60, e.g., to avoid inadvertent actuation of first folding release 60. In the embodiment shown, a separate actuation input 64 may function such that foot pedal (first folding release) 60 will not actuate unless separate actuation input 64 is placed in a specific position. This would function as an "interlock" to prevent accidental release of first folding release 60. In various embodiments, separate actuation input 64 could be disposed a short distance from first folding release 60, or even provided remotely to prevent inadvertent actuation of the release. For example, separate actuation input 64 could be disposed and/or configured such that it must be actuated by a second operator (e.g., different from the first operator of the first folding release 60).

In some embodiments, a folding release knob 66 (also referred to herein as second folding release 66, since it need not be configured as a knob, but could also be a lever, switch, button, etc.) may be configured to enable pivotable movement of the elongate support portion 72 away from its supporting configuration and toward the folded configuration when the second folding release 66 is disengaged. In the supporting configuration (e.g., during patient use), the second folding release 66 is configured to hold the elongate support portion 72 in the supporting configuration, e.g., while the second folding release knob 66 is engaged. Second folding release 66 may be operably coupled to support bracket 70 as shown. Additionally, in some embodiments, a folded locking mechanism 62 (also referred to herein as foot-activated lock 62) may be desirable to ensure the stander 10 remains folded (e.g., with the elongate support portion 72 engaged or "locked" in the folded configuration) prior to re-positioning the stander 10 in an upright position for storage. Folded locking mechanism 62 may be configured to releasably secure the elongate support portion 72 in the folded configuration. Folded locking mechanism 62 may be a foot-pedal actuated mechanism, as depicted in FIG. 6C, or could take other suitable forms (e.g., any suitable releasable locking mechanism such as a releasable ratchet mechanism). In some further embodiments, it may also be desirable to prevent the folding release knob 66 from being disengaged unless or until the first folding release 60 (foot pedal release 60) has been actuated and the patient support frame 92 has been pivoted to be generally aligned with the elongate support portion 72.

Various examples have been described with respect to the accompanying drawing figures. The embodiments described above are intended to be merely exemplary; numerous variations and modifications will be apparent to those of ordinary skill in the art. Such variations and modifications are intended to be within the scope of various embodiments as claimed herein.

What is claimed is:

1. An adjustable stander comprising:
- a base portion comprising a lateral support and a forward support, a first end of the forward support coupled to a central portion of the lateral support;
- a main support portion, the main support portion comprising:
  - a support bracket, the support bracket coupled to the base portion; and
  - an elongate support portion, the elongate support portion pivotably coupled to the support bracket and configured to pivot between a supporting configuration and a folded configuration, the elongate support portion being generally parallel to the forward support of the base portion when in the folded configuration;
- a patient support portion, the patient support portion configured to support a body of a person, the patient support portion comprising a patient support frame and at least one footrest disposed near a first end of the patient support portion, the patient support frame being pivotably coupled to the elongate support portion near a second end of the patient support portion, and the patient support frame configured to be positioned generally parallel to the elongate support portion and the forward support when the elongate support portion is in the folded configuration; and
- a first folding release, the first folding release configured to enable pivotable movement of the elongate support portion away from the supporting configuration and toward the folded configuration when the first folding release is disengaged.

2. The adjustable stander of claim 1 wherein the first folding release is operably coupled to the support bracket.

3. The adjustable stander of claim 1 wherein the first folding release is configured to hold the elongate support portion in the supporting configuration when the first folding release is engaged.

4. The adjustable stander of claim 1 further comprising a second folding release, the second folding release configured to enable pivotable movement of the patient support frame relative to the elongate support portion upon actuation of the second folding release.

5. The adjustable stander of claim 4 wherein the first folding release is prevented from being disengaged until the second folding release has been actuated and the patient support frame has been pivoted to be generally aligned with the elongate support portion.

6. The adjustable stander of claim 4 wherein actuation of the second folding release requires a separate actuation input.

7. The adjustable stander of claim 6 wherein the separate actuation input is provided remotely from the second folding release to prevent inadvertent actuation of the second folding release.

8. The adjustable stander of claim 6 wherein the separate actuation input is provided by a second operator different from a first operator of the second folding release to prevent inadvertent actuation of the second folding release.

9. The adjustable stander of claim 4 wherein the lateral support has a first wheel and a second wheel rotatably coupled to the lateral support.

10. The adjustable stander of claim 9 wherein the second folding release, the first wheel of the lateral support, and the second wheel of the lateral support are configured to function as a tripod to support the adjustable stander in an upright storage configuration when the elongate support portion is in the folded configuration.

11. The adjustable stander of claim 4 wherein the forward support further comprises a cross-member disposed near a second end of the forward support opposite the first end, the cross-member being arranged generally perpendicular to the forward support and having a wheel disposed at each end of the cross-member.

12. The adjustable stander of claim 1 wherein the support bracket of the main support portion is coupled to the forward support near the first end of the forward support.

13. The adjustable stander of claim 12 wherein the support bracket and the elongate support portion are pivotably coupled at a pivot point disposed near an upper portion of the support bracket.

14. The adjustable stander of claim 1 wherein the support bracket of the main support portion is coupled to the lateral support near the central portion of the lateral support.

15. The adjustable stander of claim 1 further comprising a folded locking mechanism, the folded locking mechanism configured to releasably secure the elongate support portion in the folded configuration.

16. An adjustable stander comprising:

a base portion comprising a lateral support and a forward support, a first end of the forward support coupled to a central portion of the lateral support;

a main support portion, the main support portion comprising:

a support bracket, the support bracket coupled to the base portion; and an elongate support portion, the elongate support portion having a first end coupled to the support bracket, the elongate support portion configured to extend away from the support bracket; and a patient support portion, the patient support portion configured to support a body of a person, the patient support portion comprising:

a patient support frame;

at least one footrest disposed near a first end of the patient support portion;

a pivotable coupling disposed near a second end of the patient support portion opposite the first end of the patient support portion, the pivotable coupling configured to pivotably couple the patient support portion to the elongate support portion; and at least one adjustable body support coupled to the patient support frame, the at least one adjustable body support comprising:

a patient contact surface;

a first elongate attachment bar coupled to the patient contact surface, the first elongate attachment bar having a polygonal cross sectional shape; and a releasably engageable fastener, wherein the at least one adjustable body support is configured to be repositioned upon releasing the releasably engageable fastener (a) by translating one or more of the patient contact surface and the releasably engageable fastener along an axis of the first elongate attachment bar, and (b) by rotating one or more of the patient contact surface and the releasably engageable fastener about the axis of the first elongate attachment bar.

17. The adjustable stander of claim 16 wherein the polygonal cross sectional shape of the first elongate attachment bar is one of the following: triangular, rectangular/square, pentagonal, hexagonal, heptagonal, or octagonal.

18. The adjustable stander of claim 16 wherein the at least one adjustable body support further comprises a second elongate attachment bar, the second elongate attachment bar pivotably coupled to the first elongate attachment bar at a pivot joint, the pivot joint comprising a release button configured to releasably adjust an angle formed between the first elongate attachment bar and the second elongate attachment bar.

19. The adjustable stander of claim 18 wherein the pivot joint is configured to releasably adjust the angle formed between the first elongate attachment bar and the second elongate attachment bar to a plurality of detent positions upon actuation of the release button.

20. The adjustable stander of claim 18 wherein the pivot joint is configured to releasably adjust the angle formed between the first elongate attachment bar and the second elongate attachment bar to a fully open position upon actuation of the release button to facilitate rapid egress of a person from the adjustable stander.

21. The adjustable stander of claim 16 wherein the elongate support portion is pivotably coupled to the support bracket and configured to pivot between a supporting configuration and a folded configuration, the elongate support portion being generally parallel to the forward support of the base portion when in the folded configuration, and wherein the patient support frame is pivotably coupled to the elongate support portion and configured to be positioned generally parallel to the elongate support portion and the forward support when the elongate support portion is in the folded configuration.

22. The adjustable stander of claim 16 further comprising a tray coupled to the patient support frame, the tray being releasably and adjustably coupled to the patient support frame via at least one tray support rail and at least one tray angle adjustment, the tray angle adjustment configured to:

(a) facilitate angular adjustment of the tray upward or downward relative to the patient; and (b) facilitate angular release of the tray outward from the patient to permit rapid egress of the patient from the adjustable stander.

23. An adjustable stander comprising:

a base portion;

a main support portion coupled to the base portion; and a patient support portion pivotably coupled to the main support portion, the patient support portion comprising:

a patient support frame; and at least one adjustable body support coupled to the patient support frame, the at least one adjustable body support comprising:

a support arm extending laterally from the patient support frame, the support arm having a vertical adjustment portion slidably received with a channel of the patient support frame to facilitate adjustment of a vertical position of the support arm relative to the patient support frame;

a housing coupled to the support arm and configured to be repositioned along the support arm inward and outward from the patient support frame, the housing including:

a first button configured to releasably engage with a surface feature of the support arm; and a second button configured to, upon actuation, enable pivotable movement of the housing relative to the support arm about a generally vertical axis;

one or more link arms coupled to the housing; and a patient contact surface coupled to the one or more link arms, the patient contact surface configured to support a portion of a patient positioned against the patient contact surface.

24. The adjustable stander of claim 23 wherein the base portion further comprises a plurality of wheels configured to support a patient in the patient support portion.

25. The adjustable stander of claim 23 wherein the main support portion further comprises:

a support bracket, the support bracket coupled to the base portion; and an elongate support portion, the elongate support portion having a first end coupled to the support bracket, the elongate support portion configured to extend away from the support bracket.

26. An adjustable body support for a mobile stander, the adjustable body support comprising:

a support arm configured to extend laterally from a patient support frame of the mobile stander, the support arm having a vertical adjustment portion configured to be slidably received within a channel of the patient support frame to facilitate adjustment of a vertical position of the support arm relative to the patient support frame;

a housing coupled to the support arm and configured to be repositioned along the support arm inward and outward from the patient support frame, the housing including:

a first actuator configured to releasably engage with a surface feature of the support arm; and a second actuator configured to, upon actuation, enable pivotable movement of the housing relative to the support arm about a generally vertical axis;

one or more link arms coupled to the housing; and a patient contact surface coupled to the one or more link arms, the patient contact surface configured to support a portion of a patient positioned against the patient contact surface.

* * * * *